July 24, 1962 D. A. DAVIO 3,045,638
PANEL INSTRUMENT ATTACHMENT
Filed Feb. 1, 1960

Inventor
Donald A. Davio
by Roberts, Cushman & Grover
Attys

United States Patent Office 3,045,638
Patented July 24, 1962

3,045,638
PANEL INSTRUMENT ATTACHMENT
Donald A. Davio, Manchester, N.H., assignor to Minneapolis-Honeywell Regulator Company, Minneapolis, Minn., a corporation of Delaware
Filed Feb. 1, 1960, Ser. No. 5,807
3 Claims. (Cl. 116—129)

This invention relates to indicating instruments such as electrical meters, for example panel mounted ammeters and voltmeters, and particularly to an indexing device adapted to be attached to such a meter.

Well known panel meters include a graduated scale or dial plate mounted behind a glass window in the meter housing. A pointer moved by the electrical input assumes various positions along the scale according to the input. In various installations it is desirable to mark a certain position of the pointer to indicate that the pointer is in normal position. For example, if the meter is measuring the voltage at a certain point in a power circuit, which voltage has a normal maximum or minimum value, it is useful to mark that voltage on the meter scale so that quick reference to the meter shows whether the pointer is in normal position.

It is possible to mark such a position on the scale, or provide an internal mechanism for adjusting an index device to a desired scale point. However, premarked scales have limited uses, and internal mechanisms unduly add to the cost of a meter.

Thus objects of the present invention are to provide an index device which is adjustable to any particular requirement, which does not require modification of the meter itself and which does not require a complicated mechanism internally of the meter.

According to the invention an index assembly for attachment to an instrument having mounting means and a pointer movable through positions along a path at its front comprises frame means adapted to be positioned on the instrument by said mounting means, means forming a track extending lengthwise of said path, and a rider including means engaging said track means and movable therealong and an index member adapted to extend toward the path, said rider being adjustable on the track so that said member indicates a selected position along the path of the pointer.

For the purposes of illustration a typical embodiment of the invention is shown in the accompanying drawing in which.

Figure 1:
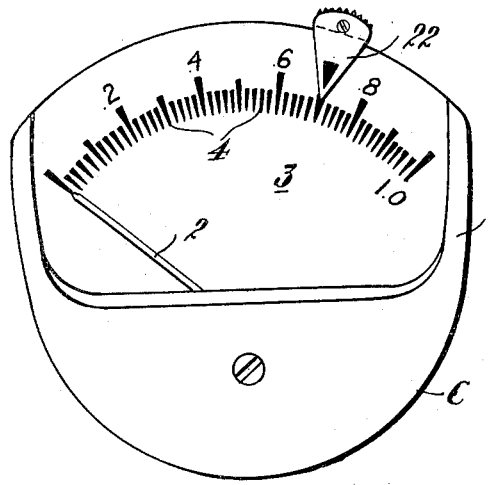
FIG. 1 is a front elevation of a meter with an index attachment.
Figure 2:
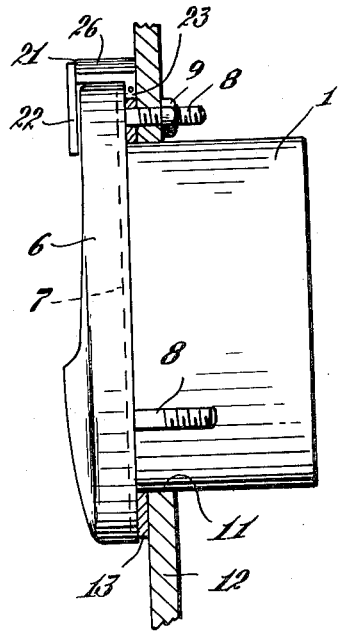
FIG. 2 is a side elevation.
Figure 3:
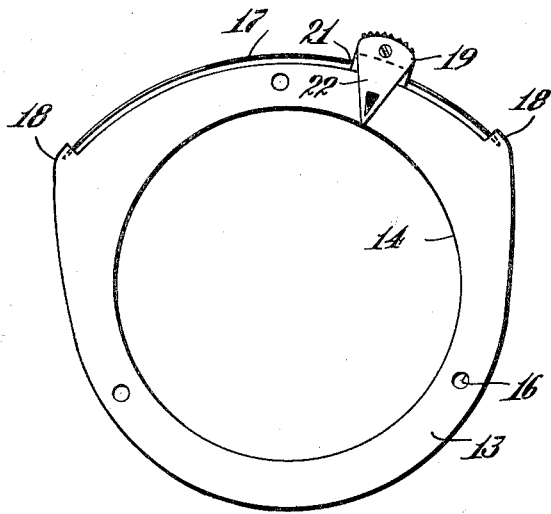
FIG. 3 is a front elevation of the index attachment.
Figure 4:
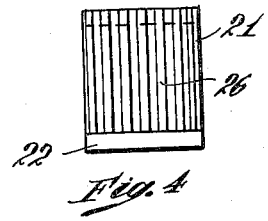
FIG. 4 is a top view of an index rider.
Figures 5, 6:
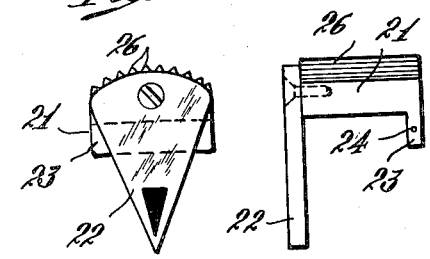
FIG. 5 is a front elevation of the index rider.
FIG. 6 is a side elevation of the index rider.

A typical panel meter shown in FIGS. 1 and 2 comprises a case C including a cylindrical housing 1 for the meter mechanism which is not shown fully but which includes a moving pointer 2. Also secured to the housing 1 is the dial plate 3 on which is marked the graduated meter scale 4. The dial plate is protected by a cover which fits over and is secured to a flange 7 on the case, so that the cover 6 and flange 7 form a front flange portion for the case and enclose the scale. Conventionally the case is provided with three threaded studs 8 which with a nut 9 secure the case in an opening 11 in a panel 12.

The novel index attachment according to the present invention is shown in FIGS. 3 to 6, and comprises a frame plate 13 having a circular aperture 14 fitting over the cylindrical meter housing 1. Stud holes 16 are located in the positions corresponding to the studs 8. At the upper edge of the frame is a track formed by a curved wire 17 secured in ears 18 on the frame.

The wire passes through an index rider comprising a body 21 and a pointed index member 22. The body has an extension 23 apertured at 24 to receive the wire 17. The rider extension 23 is slightly less in thickness than the frame plate 13 so that when the frame plate is clamped between the meter flange 7 and the panel 12 the rider is free to slide along the guide wire 17 but at the same time is held in position by the sliding fit of the extension 23 between the flange and panel. The body of the rider extends over the top of the flange portion formed by the cover 6 with the index member 22 extending downward adjacent the scale 4. A knurled portion 26 facilitates adjustment of the rider along the guide wire so that the point of the index member may be located at any selected position through which the pointer 2 may pass along the scale. Preferably the aperture 24 through the rider body is straight and the wire 17 stiffly resilient so that a flexing of the wire in the rider aperture creates a moderate frictional grip which holds the rider in adjusted position.

From the foregoing description it can be seen that the index device is a simple, economically produced attachment which is easily attached to the meter during installation on a panel. The thinness of the plate allows the meter to lie close to its normal position against the panel 6. The frame plate 13 and guide wire 17 are smaller in outline than the cover 6 and are thus neatly concealed behind the cover. Thus only the index member is noticeable at the front of the meter.

By the provision of a separate index device so easily attached to the meter a manufacturer of an apparatus having several panel meters is given the choice of using an index device when needed without purchasing special meters with premarked dials or expensive internal index mechanisms.

It should be understood that the present disclosure is for the purpose of illustration only and that this invention includes all modifications and equivalents which fall within the scope of the appended claims. For example the attachment can be made for instruments whose scales are curved in various ways with respect to the meter housing, or even with straight scales.

I claim:

1. For use with a panel having an opening, an instrument having a housing extending through the opening and a flange overlapping the front of the panel with a space between the flange and panel, said flange having an edge facing away from said opening, and an attachment including a member, track, rider and pointer, said member fitting in said space, said track being mounted on said member and extending circumferentially of said housing, said rider being slidably mounted on said track and said pointer being fast to the rider and extending over said flange and thence in front of the flange, and means for clamping said member between said flange and panel so that said attachment is removable by unclamping said member.

2. The combination according to claim 1 wherein said member comprises a plate which is thicker than said rider so that the rider is not clamped by said means.

3. The combination according to claim 1 wherein said member has an aperture and said clamping means comprises a stud extending through said aperture.

References Cited in the file of this patent

UNITED STATES PATENTS

| 1,523,305 | Spiro | Jan. 13, 1925 |
| 1,606,936 | Hapgood | Nov. 16, 1926 |
| 1,881,389 | Ricketts | Oct. 4, 1932 |
| 2,201,941 | Behr | May 21, 1940 |

FOREIGN PATENTS

| 442,962 | Italy | Dec. 3, 1948 |